(12) United States Patent
Sonu et al.

(10) Patent No.: US 8,945,275 B2
(45) Date of Patent: Feb. 3, 2015

(54) METHOD FOR RECOVERING VALUABLE METALS FROM LITHIUM SECONDARY BATTERY WASTES

(75) Inventors: Chong Ho Sonu, Seongnam-si (KR); Min Jae Lee, Ulsan (KR); Sung Chen Ahan, Yongin-si (KR); Byoung Kook Jeon, Cheonan-si (KR); Bo Eun Kim, Seoul (KR)

(73) Assignee: LS-Nikko Copper Inc., Ulsan (KR)

( * ) Notice: Subject to any disclaimer, the term of this patent is extended or adjusted under 35 U.S.C. 154(b) by 0 days.

(21) Appl. No.: 13/878,680

(22) PCT Filed: Sep. 30, 2011

(86) PCT No.: PCT/KR2011/007266
§ 371 (c)(1),
(2), (4) Date: Apr. 10, 2013

(87) PCT Pub. No.: WO2012/050317
PCT Pub. Date: Apr. 19, 2012

(65) Prior Publication Data
US 2013/0192425 A1    Aug. 1, 2013

(30) Foreign Application Priority Data
Oct. 12, 2010    (KR) .................. 10-2010-0099374

(51) Int. Cl.
*C22B 3/00* (2006.01)
*C22B 26/12* (2006.01)
*C22B 47/00* (2006.01)
(Continued)

(52) U.S. Cl.
CPC ........... *C22B 23/0415* (2013.01); *C22B 3/0068* (2013.01); *C22B 7/007* (2013.01); *C22B 26/12* (2013.01); *C22B 47/00* (2013.01)
USPC .............................................. 75/743; 210/634

(58) Field of Classification Search
CPC .............. C22B 3/20; C22B 3/06; C22B 3/08; C22B 7/007; C22B 47/0063; C22B 23/0415; C22B 23/043; C22B 26/1233
USPC .............................................. 75/743; 210/634
See application file for complete search history.

(56) References Cited

U.S. PATENT DOCUMENTS 6,007,600 A    12/1999    Hyvarinen et al.

FOREIGN PATENT DOCUMENTS

| CN | 85100108 A | 7/1986 |
| CN | 101560670 A | 10/2009 |

(Continued)

OTHER PUBLICATIONS

Machine translation of CN 101280357 A published Oct. 8, 2008.*
(Continued)

*Primary Examiner* — George Wyszomierski
*Assistant Examiner* — Tima M McGuthry Banks
(74) *Attorney, Agent, or Firm* — Sughrue Mion, PLLC

(57) ABSTRACT

Valuable metals such as cobalt, nickel, manganese, and lithium can be economically recovered from various lithium secondary battery-related wastes by the inventive method which comprises liquid-phase leaching a scrap powder containing Co, Ni, Mn, and Li, and purifying and solvent-extracting the resulting leaching solution to recover each of said Co, Ni, Mn, and Li, wherein the liquid-phase leaching is performed by a two-step counter-current leaching using an inorganic acid solution or a mixed solution of an inorganic acid and hydrogen peroxide.

5 Claims, 2 Drawing Sheets

(51) Int. Cl.
*C22B 3/38* (2006.01)
*C22B 7/00* (2006.01)

(56) References Cited

FOREIGN PATENT DOCUMENTS

| JP | 11-265736 A | 9/1999 |
| JP | 2009-193778 A | 8/2009 |
| KR | 2003-0004657 A | 1/2003 |

OTHER PUBLICATIONS

Machine translation of CN 101270415 A published Sep. 24, 2008.*
Machine translation of CN 101603126 B published Nov. 10, 2010.*

* cited by examiner

METHOD FOR RECOVERING VALUABLE METALS FROM LITHIUM SECONDARY BATTERY WASTES

CROSS REFERENCE TO RELATED APPLICATIONS

This application is a National Stage of International Application No. PCT/KR2011/007266, filed on Sep. 30, 2011, which claims priority from Korean Patent Application No. 10-2010-0099374, filed on Oct. 12, 2010, the contents of all of which are incorporated herein by reference in their entirety.

TECHNICAL FIELD

The present invention relates to an economical method for recovering valuable metals such as cobalt, nickel, manganese, and lithium from various wastes that are generated during the lithium secondary battery manufacturing process or from used batteries.

BACKGROUND ART

Lithium secondary batteries are widely used as power sources for communication and information equipments such as cell phones, notebooks, and digital cameras due to their high operating voltage, improved charge-discharge cycle, and their adaptability to miniaturization. In addition, the anticipated large-scale commercialization of an electric car is expected to a rapidly increasing demand for the lithium secondary batteries.

$LiCoO_2$, which is easily synthesized, and has such desired characteristics as high reversibility, low self-discharge rate, high capacity, and high energy density, had been generally used as a cathode active material of lithium secondary batteries. However, for the purpose of reducing the amount of high-priced Co used, lithium salts containing equivalent amounts of Co, Ni and Mn, i.e., three element-based lithium metal oxides are currently used as the cathode active material. An aluminum foil with a lithium salt-containing coating layer formed thereon is used as a cathode, the coating layer being formed using a mixture of the lithium salt, a binder and a solvent.

Besides Co, Ni, Mn, and Li are also valuable, relatively expensive metals, and there have been active studies on economically feasible methods for recovering such metals. These metals are generally recovered by treating the wastes (composition comprising valuable metals such as Co, Ni, Mn, and Li, impurities such as Al, Fe, and Cu, and carbon; hereinafter, referred to as "scrap powders") with an inorganic acid; removing impurities from the resulting leaching solution; and extracting each of the valuable metals present in the resulting leaching solution with an appropriate organic solvent to selectively isolate each metal component.

For example, Korean Patent Publication No. 2009-87801 discloses methods of improving the leaching rates of metals to be recovered by using a various highly concentrated acids at the leaching process. Such conventional methods, however, have the problem that as excessive amounts of acids are present in the leaching solution, the use of a large amount of an expensive neutralizing agent is required in the purifying and solvent-extraction processes.

SUMMARY OF INVENTION

Accordingly, it is a primary object of the present invention to provide an economical method for recovering high purity valuable metals such as cobalt, nickel, manganese, and lithium from various wastes that are generated during the lithium secondary battery manufacturing process or from used batteries.

In accordance with one aspect of the present invention, there is provided a method for recovering valuable metals comprising:

liquid-phase leaching a scrap powder containing Co, Ni, Mn, and Li, and purifying and solvent-extracting the resulting leaching solution to recover each of said Co, Ni, Mn, and Li, wherein the liquid-phase leaching is performed by a two-step counter-current leaching using an inorganic acid solution or a mixed solution of an inorganic acid and hydrogen peroxide.

BRIEF DESCRIPTION OF DRAWINGS

The above and other objects and features of the present invention will become apparent from the following description of the invention taken in conjunction with the following accompanying drawings, which respectively show.

BEST MODE FOR CARRYING OUT THE INVENTION

Figure 1:
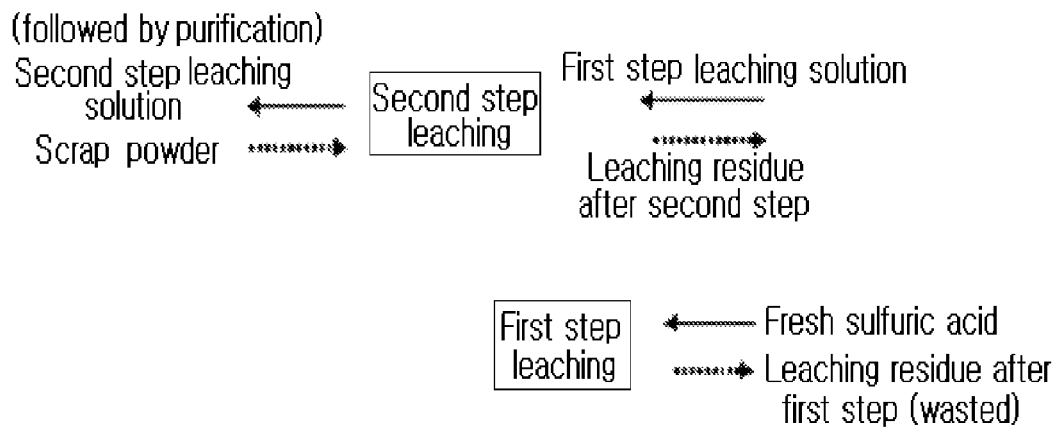
FIG. 1: a schematic diagram showing one embodiment of a two-step counter-current leaching process of the present invention.

The inventive method for recovering valuable metals is characterized by comprising the steps of liquid-phase leaching a scrap powder containing Co, Ni, Mn, and Li, and purifying (first purification) and solvent-extracting (second purification) the resulting leaching solution to recover each of said Co, Ni, Mn, and Li, the liquid-phase leaching being a two-step counter-current leaching using an inorganic acid solution or a mixed solution of an inorganic acid and hydrogen peroxide.

The term "scrap powder" used herein means a powder obtained by treating with a conventional method various wastes (i.e., various forms of scraps, jelly rolls, slurries, wasted batteries, and the like) which are generated during the manufacturing process of lithium secondary batteries or from used lithium secondary battery wastes. One embodiment of the treatment method for transforming collected solid wastes such as scraps into a powder thereof is as follows: the solid wastes are cut into a powder of an appropriate size, be first distributed and calcined to separate electrode active materials from the current collector, and to volatilize other organic materials and a separator. Then, the resulting calcined solid is subjected to be second distributed and sorted by a combination of specific gravity sorting, magnetism sorting, etc. to get a desired scrap powder.

The scrap powder thus obtained necessarily comprises valuable metals including Co, Ni, Mn, and Li, and it further comprises impurities such as Al, Fe, Cu, and carbon, but its composition widely varies depending on the nature of the scrap treated. For instance, used in the working Example according to the present invention was a scrap powder containing 1~10 parts by weight of Li, 5~30 parts by weight of Mn, 5~45 parts by weight of Co, 5~30 parts by weight of Ni, 0.5~5 parts by weight of Fe, 0.5~5 parts by weight of Cu, and 0.5~5 parts by weight of Al, based on the total amount of the powder.

In accordance with the inventive method, the scrap powder is subjected to a two-step counter-current leaching using an inorganic acid solution, preferably a mixture of an inorganic acid and hydrogen peroxide to minimize the amount of the acid unreacted. This gives a beneficial effect to minimize the amount of a neutralizing agent used for increasing pH in the subsequent process.

The inorganic acid solution may be a sulfuric acid or hydrochloric acid solution. Preferably, a sulfuric acid solution having a concentration of 240 g/L or higher, more preferably having the concentration of 240 g/L may be used in a proper amount.

In addition, hydrogen peroxide may be preferably used in an amount of no less than 20 g, more preferably 20 g (belonging to a total amount used in the two steps), based on 1 L of the inorganic acid solution. When the amount of hydrogen peroxide is below 20 g, an unsatisfactory reduction of the scrap powder occurs, which makes it impossible to achieve its complete leaching under a condition of a similar leaching temperature and time. Meanwhile, as hydrogen peroxide is expensive, it should not be used in an excessive amount over 20 g.

In the two-step counter-current leaching process, the first and the second steps may be each independently performed at a temperature ranging from 60 to 80° C. for 4 to 6 hrs. When the leaching temperature is below 60° C., insufficient leaching of desired valuable metals occurs, which makes the leaching time prolonged; and when more than 80° C., a leaching reactor made of a high temperature-resistant substance should be employed. When the leaching time is less than 4 hrs, insufficient leaching of desired valuable metals also occurs; and when more than 6 hrs, an operating time becomes too long, which causes a high operation cost.

In one preferred embodiment of the inventive two-step counter-current leaching process using a mixed solution of an inorganic acid and hydrogen peroxide, 10 g of hydrogen peroxide is added to 1 L of a 240 g/L sulfuric acid solution, and in the resulting solution, 150 g of a scrap powder containing Co, Ni, Mn, and Li valuable metals is subjected to first step leaching at 60° C. for 4 hrs. Then, as a second step leaching process, 150 g of a scrap powder and 10 g of hydrogen peroxide are added to the resulting first step leaching solution, followed by second step leaching at 60° C. for 4 hrs. The leaching solution obtained after the second step leaching process is introduced to a subsequent purification process, while a leaching residue generated after the second step leaching process is introduced into the first step leaching process, stirred at 60° C. for 4 hrs with a 240 g/L sulfuric acid solution and 10 g of hydrogen peroxide, and then is discharged as a process waste. Most of the two-step leaching residue thus generated is carbon. One preferred embodiment of the two-step counter-current leaching process of the present invention is shown in FIG. 1.

In fact, although only one-step leaching is performed as in a conventional method, perfect leaching of all of Co, Ni, Mn, and Li can be achieved. In this case, however, the amount of acids remaining in the resulting leaching solution is too much, which causes the need to use of an excessive amount of a neutralizing agent used for increasing pH in the subsequent purification and solvent-extraction processes. Unlike the conventional one-step leaching method, the inventive two-step counter-current leaching method can result in 100% perfect leaching of all of Co, Ni, Mn, and Li, and it can also minimize the amount of the acids remaining in the resulting leaching solution, as well as that of the neutralizing agent. Accordingly, the inventive method is even more economical as compared to the conventional one-step leaching method.

Besides the desired valuable metals such as Co, Ni, Mn, and Li, impurities such as Al, Fe, and Cu are present in the leaching solution. Thus, in order to secure in advance the purity of the desired metals to be recovered and to prevent operation problems in the subsequent solvent-extraction process, the impurities including Al, Fe, and Cu are allowed to be removed in advance through a first purification process.

Specifically, Fe or Al may be removed from the leaching solution by adjusting the pH of the solution to 4.5 to 5.0 by adding a dilute NaOH solution thereto, thereby generating a hydroxide of Fe or Al, and then filtering the resulting solution. Alternatively, Cu may be removed therefrom by adding NaSH thereto, thereby generating a sulfide of Cu, and then filtering the resulting solution. These reactions in the purification process are represented in detail as in Reaction Scheme A:

<Reaction Scheme A>

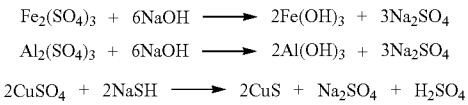

$$Fe_2(SO_4)_3 + 6NaOH \longrightarrow 2Fe(OH)_3 + 3Na_2SO_4$$

$$Al_2(SO_4)_3 + 6NaOH \longrightarrow 2Al(OH)_3 + 3Na_2SO_4$$

$$2CuSO_4 + 2NaSH \longrightarrow 2CuS + Na_2SO_4 + H_2SO_4$$

Preferably, in order to enhance the filtration property of the hydroxide of Fe or Al, prior to the adjustment of pH (4.5 to 5.0) through addition of the dilute sodium hydroxide solution, $CaCO_3$ may be added to the leaching solution, and after the adjustment of pH and before the filtration, NaSH may be added thereto, which greatly shortens a filtration time, and further, a whole operation time. When pH of the leaching solution is controlled to below 4.5, perfect removal of Fe or Al does not occur, and consequently, a purity of desired valuable metals becomes low; and when pH of the leaching solution, more than 5.0, a part of desired valuable metals disadvantageously forms a hydroxide thereof which is removed by filtration, which brings out undesired loss.

According to the inventive purification process, the Al, Fe, and Cu impurities are completely removed, and simultaneously, loss of the Co, Ni, Mn, and Li valuable metals hardly occurs.

Then, the leaching solution containing Co, Ni, Mn, and Li, from which impurities were removed, is subjected to a solvent-extraction process, wherein respective extractions of Mn, Co, and Ni are performed in order using three kinds of acidic extracting agents which are known to be suitable for Mn, Co, and Ni extractions, respectively. A solution containing only lithium is obtained after the Ni extraction step. Consequently, complete separation of the metals from each other is achieved, and each of Co, Ni, Mn, and Li is recovered.

Suitable for use as an Mn extracting agent is D2EHPA (di-2-ethylhexylphosphoric acid) commercially available from LANXESS Corporation; suitable for use as a Co extracting agent is CYANEX 272 (bis(2,4,4-trimethylpentyl)phosphinic acid), from CYTEC Industries; and suitable for use as an Ni extracting agent is VS-10 (neodecanoic acid), from Hexion, but not limited thereto. A specific extraction and recovery method of each of the valuable metals is in the following:

(1) Recovery of Mn

Figure 2:
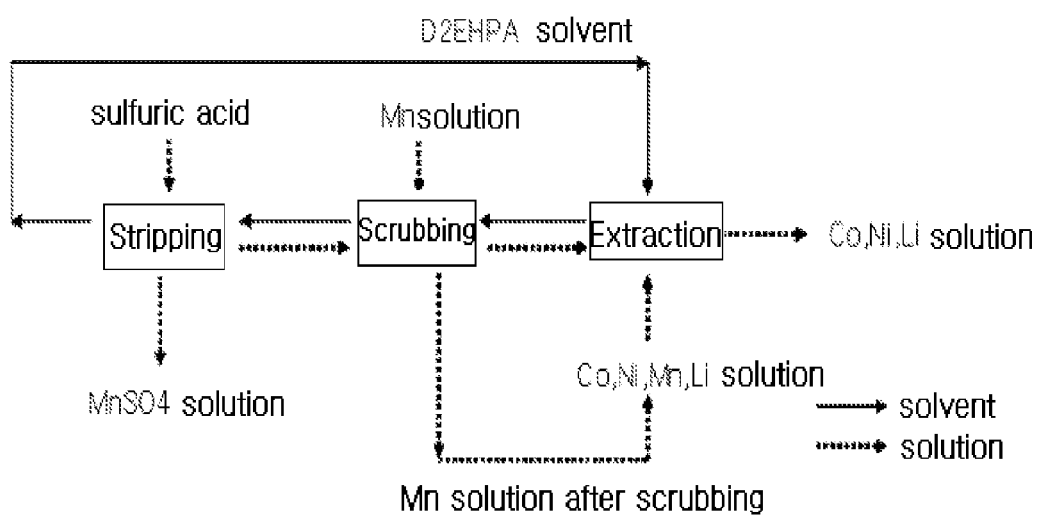
FIG. 2: a schematic diagram of a multi-step counter-current extraction process for recovering Mn from a purified leaching solution containing Li, Mn, Co, and Ni using a D2EHPA (di-2-ethylhexylphosphoric acid) extracting agent.

For the purpose of recovering Mn, the purified leaching solution containing Li, Mn, Co, and Ni is mixed with D2EHPA, which is subjected to a multi-step counter-current extraction process. One preferred embodiment thereof is shown in FIG. 2. Preferably, D2EHPA may be used in a state diluted in kerosene. More specifically, in an "extraction" step, sodium hydroxide is added to the mixture of the leaching solution containing Li, Mn, Co, and Ni, and D2EHPA to adjust the pH thereof to 2.5 to 3.5, where extraction of Mn occurs. The solvent (D2EHPA) containing an Mn extract with small quantities of Li, Co and Ni extracts is transferred from the "extraction" step to a "scrubbing" step. In the "scrubbing" step, it is controlled to have pH ranging from 2.0 to 2.5 while stirring with an Mn-containing scrubbing solution to remove Li, Co and Ni therefrom. The resulting solvent containing only an Mn extract is transferred from the "scrubbing" step to a "stripping" step. In the "stripping" step, the solvent is stirred with a 50 g/L or higher sulfuric acid solution, where Mn in the solvent is stripped by the sulfuric acid solution. Finally, a $MnSO_4$ solution having Mn thus stripped in an amount of 30 to 40 g/L is obtained. The solution containing Mn, Li, Ni, and Co generated after used in the "scrubbing" step is charged again to the "extraction" step.

Sodium carbonate may be added to the $MnSO_4$ solution thus obtained, thereby recovering Mn in a form of $MnCO_3$.

(2) Recovery of Co

Figure 3:
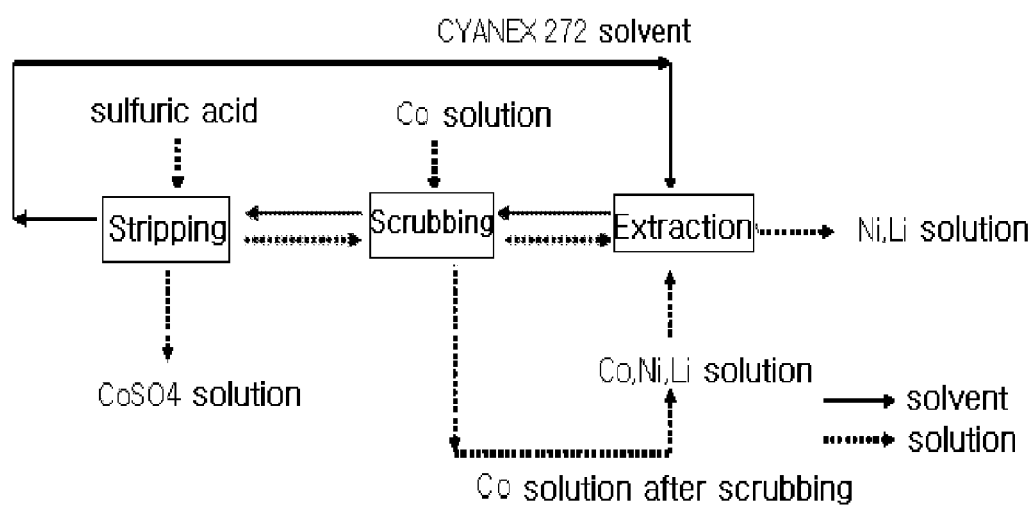
FIG. 3: a schematic diagram of a multi-step counter-current extraction process for recovering Co from the solution containing Li, Co, and Ni obtained after Mn extraction using a CYANEX 272 (bis(2,4,4-trimethylpentyl)phosphinic acid) extracting agent.

For the purpose of recovering Co, the solution containing Li, Co, and Ni obtained after the Mn extraction process is mixed with CYANEX 272, which is subjected to a multi-step counter-current extraction process. One preferred embodiment thereof is shown in FIG. 3. Preferably, CYANEX 272 may be used in a state diluted in kerosene. More specifically, in an "extraction" step, sodium hydroxide is added to the mixture of the solution containing Li, Co, and Ni obtained after Mn extraction and CYANEX 272 to adjust the pH thereof to 5.0 to 5.5, where extraction of Co occurs. The solvent (CYANEX 272) containing a Co extract with small quantities of Li and Ni extracts is transferred from the "extraction" step to a "scrubbing" step. In the "scrubbing" step, it is controlled to have pH ranging from 4.5 to 4.8 while stirring with a Co-containing scrubbing solution to remove Li and Ni therefrom. The resulting solvent containing only a Co extract is transferred from the "scrubbing" step to a "stripping" step. In the "stripping" step, the solvent is stirred with a 50 g/L or higher sulfuric acid solution, where Co in the solvent is stripped by the sulfuric acid solution. Finally, a $CoSO_4$ solution having Co thus stripped in an amount of 50 to 60 g/L is obtained. The solution containing Li, Ni, and Co generated after used in the "scrubbing" step is charged again to the "extraction" step.

The $CoSO_4$ solution thus obtained may be subjected to a conventional electrowinning, thereby recovering Co metal.

(3) Recovery of Ni

Figure 4:
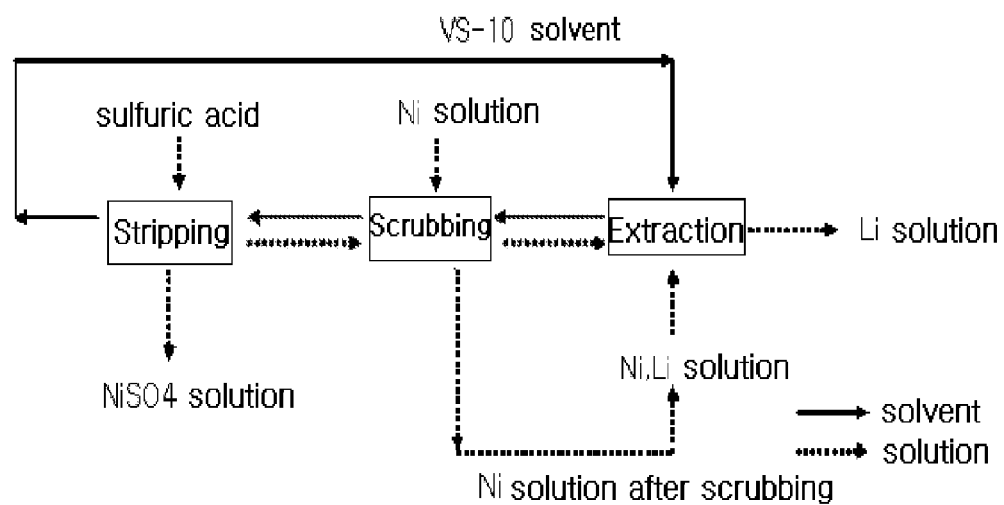
FIG. 4: a schematic diagram of a multi-step counter-current extraction process for recovering Ni from the solution containing Li and Ni obtained after Co extraction using a VS-10 (neodecanoic acid) extracting agent.

For the purpose of recovering Ni, the solution containing Li and Ni generated after the Co extraction process is mixed with VS-10, which is subjected to a multi-step counter-current extraction process. One preferred embodiment thereof is shown in FIG. 4. Preferably, VS-10 may be used in a state diluted in kerosene. More specifically, in an "extraction" step, sodium hydroxide is added to the mixture of the solution containing Li and Ni obtained after Co extraction and VS-10 to adjust the pH thereof to 6.0 to 7.0, where extraction of Ni occurs. The solvent (VS-10) containing an Ni extract with a small quantity of an Li extract is transferred from the "extraction" step to a "scrubbing" step. In the "scrubbing" step, it is controlled to have pH ranging from 5.0 to 6.0 while stirring with an Ni-containing scrubbing solution to remove Li therefrom. The resulting solvent containing only an Ni extract is transferred from the "scrubbing" step to a "stripping" step. In the "stripping" step, the solvent is stirred with a 50 g/L or higher sulfuric acid solution, where Ni in the solvent is stripped by the sulfuric acid solution. Finally, a $NiSO_4$ solution having Ni thus stripped in an amount of 100 g/L is obtained. The solution containing Li and Ni generated after used in the "scrubbing" step is charged again to the "extraction" step.

The $NiSO_4$ solution thus obtained may be subjected to a conventional electrowinning, thereby recovering Ni metal.

(4) Recovery of Li

A solution containing only lithium is obtained after the Ni extraction step. Lithium may be recovered in a form of $Li_2CO_3$ by addition of sodium carbonate.

As previously mentioned above, the desired valuable metals of a high purity can be recovered through the solvent-extraction process (second purification process), and the recovery can be on the basis of conventional various methods including metal precipitation, electrowinning, and the like.

As described above, the inventive method can minimize the amount of acids remaining in a leaching solution, thereby minimizing the amount of a neutralizing agent used in a subsequent process. Accordingly, in accordance with the inventive method, valuable metals such as cobalt, nickel, manganese, and lithium can be economically recovered from various wastes that are generated during the lithium secondary battery manufacturing process as well as from used batteries. In addition, in accordance with the inventive method, a filtration property required in a purification process can be significantly improved, and thus, a whole operation time can be shortened.

Further, the inventive method can be also employed for recovering desired valuable metals from other wastes or minerals having the valuable metals, besides lithium secondary batteries.

The following Examples are given for the purpose of illustration only, and are not intended to limit the scope of the invention.

Example 1

Leaching Process

[Leaching Condition]

Leaching method: one-step or two-step counter-current leaching

Scrap powder: pulp density of 75 or 150 g/L (containing 1~10 parts by weight of Li, 5~30 parts by weight of Mn, 5~45 parts by weight of Co, 5~30 parts by weight of Ni, 0.5~5 parts by weight of Fe, 0.5~5 parts by weight of Cu, and 0.5~5 parts by weight of Al, based on 100 parts by weight of the powder)

Sulfuric acid solution: 1000 ml of a 240 or 350 g/L solution

Hydrogen peroxide: 20 or 40 g based on 1 L of a sulfuric acid solution (in case of the two-step leaching process, this corresponds to the total amount used in the first and second steps)

Reaction temperature: 60° C. (based on each step)

Reaction time: 4 hrs (based on each step)

Leaching of the scrap powder having the above-mentioned composition was performed under the conditions shown Table 1. Especially, in case of two-step counter-current leaching, 10 g of hydrogen peroxide was added to 1 L of a 240 g/L sulfuric acid solution, and in the resulting solution, 150 g of the scrap powder was subjected to first step leaching at 60° C. for 4 hrs. Then, the resulting first step leaching solution was introduced into a second step leaching process, in which 150 g of the scrap powder and 10 g of hydrogen peroxide were added to the resulting first step leaching solution, followed by second step leaching at 60° C. for 4 hrs. The leaching residue generated from the second step leaching was introduced into the first step leaching process, stirred at 60° C. for 4 hrs with a 240 g/L sulfuric acid solution and 10 g of hydrogen peroxide, and then was discharged as a process waste (see FIG. 1). The results of one-step or two-step counter-current leaching thus performed are shown in Table 1.

TABLE 1

| Leaching condition | | | Leaching rate (%) | | | | Remaining free acids (g/L) | Amount of neutralizing agent (g) |
|---|---|---|---|---|---|---|---|---|
| | | | Li | Mn | Co | Ni | | |
| One-step | (1-1) | 150 g/L powder + 350 g/L sulfuric acid + 20 g/L hydrogen peroxide | 100 | 100 | 100 | 100 | 70 | 60 |
| | (1-2) | 75 g/L powder + 240 g/L sulfuric acid + 20 g/L hydrogen peroxide | 100 | 100 | 100 | 100 | 50 | 45 |
| | (1-3) | 150 g/L powder + 240 g/L sulfuric acid + 40 g/L hydrogen peroxide | 100 | 100 | 100 | 100 | 40 | 35 |
| Two-step counter current | (1-4) | 150 g/L powder + 240 g/L sulfuric acid + 20 g/L hydrogen peroxide | 100 | 100 | 100 | 100 | 2 | 1.5 |

As can be seen from the results of Table 1, perfect leaching of all of Co, Ni, Mn, and Li is achieved by either one-step leaching or two-step leaching. In case of the one-step leaching, however, the amount of acids remaining in the resulting leaching solution is too much, which causes the need to use of an excessive amount of a neutralizing agent. Unlike such a one-step leaching, the inventive two-step counter-current leaching can result in 100% perfect leaching of all of Co, Ni, Mn, and Li, and it can also minimize the amount of the acids remaining in the resulting leaching solution, as well as that of the neutralizing agent. Such a result suggests that the inventive method is even more economical as compared to the conventional one-step leaching method.

Example 2

Purification Process

Purification of the leaching solution obtained after the two-step counter-current leaching ((1-4)) in Example 1 was conducted according to the method shown in Table 2. In Table 2, the term "iron-removing reaction" means converting each of Fe and Al to a hydroxide thereof by way of adding a dilute NaOH solution to a leaching solution to adjust the pH thereof to 4.5 to 5.0; and the term "copper-removing reaction", converting Cu to a sulfide thereof by way of adding NaSH to a leaching solution.

TABLE 2

| | Purification method | Filtration time (1 L treatment) |
|---|---|---|
| (2-1) | iron-removing reaction, first filtration, copper-removing reaction, and second filtration (totally twice filtration) | 80 min |
| (2-2) | simultaneous iron- and copper-removing reactions, and filtration | 60 min |
| (2-3) | addition of CaCO$_3$, simultaneous iron- and copper-removing reactions, and filtration | 30 min |

As can be seen from the results (filtration time) of Table 2, the case (2-3) is capable of greatly shortening a filtration time due to improvement of a filtration property, wherein the case (2-3) was conducted by adding CaCO$_3$ to a leaching solution, adding a dilute sodium hydroxide solution thereto to adjust the pH thereof to 4.5 to 5.0, and then adding NaSH thereto, followed by filtration. For reference, any one of the cases (2-1), (2-2) and (2-3) completely removes Fe, Cu, and Al, and there is only a little loss of Co, Ni, Mn, or Li metals, which is represented in Table 3.

TABLE 3

| | Impurities | | | Desired metals in a purified leaching solution | | | |
|---|---|---|---|---|---|---|---|
| | Fe | Cu | Al | Li | Mn | Co | Ni |
| Concentration (g/L) | <0.01 | <0.01 | <0.01 | 10 | 7.5 | 70 | 11.5 |
| Removing efficiency (%) | 100 | 100 | 100 | 0 | 0 | 0 | 0 |

Example 3

Solvent-extraction Process

Each of Mn, Co, Ni and Li in the purified leaching solution obtained in Example 2 was sequentially extracted and recovered (see FIGS. 2 to 4).

Specifically, for the purpose of recovering Mn, in an "extraction" step, sodium hydroxide was added to a mixture of the leaching solution containing Li, Mn, Co, and Ni and D2EHPA diluted in kerosene to adjust the pH thereof to 3.0. The solvent (D2EHPA) containing an Mn extract with small quantities of Li, Co and Ni extracts was transferred from the "extraction" step to a "scrubbing" step. In the "scrubbing" step, it was controlled to have pH of 2.3 while stirring with an Mn-containing scrubbing solution to remove Li, Co and Ni therefrom. The resulting solvent containing only an Mn extract was transferred from the "scrubbing" step to a "stripping" step. In the "stripping" step, the solvent was stirred with a 50 g/L sulfuric acid solution, where Mn in the solvent was stripped by the sulfuric acid solution. Finally, a $MnSO_4$ solution having Mn thus stripped in an amount of 30 to 40 g/L was obtained. The solution generated after used in the "scrubbing" step was charged again to the "extraction" step. Sodium carbonate was added to the $MnSO_4$ solution thus obtained, thereby recovering Mn in a form of $MnCO_3$.

Then, for the purpose of recovering Co, in an "extraction" step, sodium hydroxide was added to a mixture of the solution containing Li, Co, and Ni obtained after the Mn extraction process and CYANEX 272 diluted in kerosene to adjust the pH thereof to 5.5. The solvent (CYANEX 272) containing a Co extract with small quantities of Li and Ni extracts was transferred from the "extraction" step to a "scrubbing" step. In the "scrubbing" step, it was controlled to have pH of 4.6 while stirring with a Co-containing scrubbing solution to remove Li and Ni therefrom. The resulting solvent containing only a Co extract was transferred from the "scrubbing" step to a "stripping" step. In the "stripping" step, the solvent was stirred with a 50 g/L sulfuric acid solution, where Co in the solvent was stripped by the sulfuric acid solution. Finally, a $CoSO_4$ solution having Co thus stripped in an amount of 50 to 60 g/L was obtained. The solution generated after used in the "scrubbing" step was charged again to the "extraction" step. The $CoSO_4$ solution thus obtained was subjected to a conventional electrowinning, thereby recovering Co metal.

Then, for the purpose of recovering Ni, in an "extraction" step, sodium hydroxide was added to a mixture of the solution containing Li and Ni obtained after the Co extraction process and VS-10 diluted in kerosene to adjust the pH thereof to 6.5. The solvent (VS-10) containing an Ni extract with a small quantity of an Li extract was transferred from the "extraction" step to a "scrubbing" step. In the "scrubbing" step, it was controlled to have pH of 5.5 while stirring with a Ni-containing washing solution to remove Li therefrom. The resulting solvent containing only an Ni extract was transferred from the "scrubbing" step to a "stripping" step. In the "stripping" step, the solvent was stirred with a 50 g/L sulfuric acid solution, where Ni in the solvent was stripped by the sulfuric acid solution. Finally, a $NiSO_4$ solution having Ni thus stripped in an amount of 100 g/L was obtained. The solution generated after used in the "scrubbing" step was charged again to the "extraction" step. The $NiSO_4$ solution thus obtained was subjected to an electrowinning, thereby recovering Ni metal.

The compositions of products obtained in the respective steps are shown in Tables 4 to 6. Finally, Li was recovered in a form of $Li_2CO_3$ by adding sodium carbonate to the solution obtained after the Ni extraction process.

TABLE 4

|  | Mn | Co | Ni | Li |
| --- | --- | --- | --- | --- |
| Concentration of the solution obtained after stripping (g/L) | 30~40 | <0.01 | <0.01 | <0.01 |
| Concentration of the solution obtained after extraction (g/L) | — | 30 | 10 | 6 |
| Metal recovery (%) | 100 | — | — | — |

TABLE 5

|  | Mn | Co | Ni | Li |
| --- | --- | --- | --- | --- |
| Concentration of the solution obtained after stripping (g/L) | — | 50~60 | <0.02 | <0.02 |
| Concentration of the solution obtained after extraction (g/L) | — | — | 5 | 3.5 |
| Metal recovery (%) | — | 100 | — | — |

TABLE 6

|  | Mn | Co | Ni | Li |
| --- | --- | --- | --- | --- |
| Concentration of the solution obtained after stripping (g/L) | — | — | 100 | <0.01 |
| Concentration of the solution obtained after extraction (g/L) | — | — | — | 1.5 |
| Metal recovery (%) | — | — | 100 | — |

As can be seen from the results of Tables 4 to 6, in accordance with the inventive method, desired valuable metals of a high purity can be extracted through the solvent-extraction process (second purification process).

While the embodiments of the subject invention have been described and illustrated, it is obvious that various changes and modifications can be made therein without departing from the spirit of the present invention which should be limited only by the scope of the appended claims.

What is claimed is:

1. A method for recovering valuable metals comprising:

liquid-phase leaching a scrap powder containing Co, Ni, Mn, and Li;

purifying and solvent-extracting the resulting leaching solution to recover each of said Co, Ni, Mn, and Li, wherein the liquid-phase leaching is performed by a two-step counter-current leaching using an inorganic acid solution or a mixed solution of an inorganic acid and hydrogen peroxide, and wherein the purifying the resulting leaching solution is performed by adding $CaCO_3$ to the resulting leaching solution, adjusting a pH of the resulting leaching solution to 4.5 to 5.0 by adding a dilute NaOH solution thereto, further adding NaSH thereto, and then filtering the resulting leaching solution.

2. The method of claim 1, wherein the inorganic acid solution is a sulfuric acid solution having a concentration of 240 g/L or higher.

3. The method of claim 1, wherein the hydrogen peroxide is used in an amount of no less than 20 g based on 1 L of the inorganic acid solution.

4. The method of claim 1, wherein in the two-step counter-current leaching, the first and the second steps are each independently performed at a temperature ranging from 60 to 80° C. for 4 to 6 hrs.

5. The method of claim 1, wherein the recovery of each of Co, Ni, Mn, and Li is achieved by conducting respective extractions of Mn, Co, and Ni in order to obtain a solution containing only lithium after the Ni extraction step, thereby achieving complete separation of said metals from each other.

* * * * *